United States Patent
Su et al.

(10) Patent No.: US 9,848,034 B2
(45) Date of Patent: Dec. 19, 2017

(54) FILE TRANSFER METHOD

(71) Applicant: AVer Information Inc., New Taipei (TW)

(72) Inventors: Ping-Chen Su, New Taipei (TW); Po-Hsun Wu, New Taipei (TW); Shih-Yi Chan, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 320 days.

(21) Appl. No.: 14/824,669

(22) Filed: Aug. 12, 2015

(65) Prior Publication Data

US 2016/0241629 A1 Aug. 18, 2016

(30) Foreign Application Priority Data

Feb. 17, 2015 (TW) .............................. 104105623 A

(51) Int. Cl.
*H04L 29/08* (2006.01)
*H04L 29/06* (2006.01)

(52) U.S. Cl.
CPC .............. *H04L 67/06* (2013.01); *H04L 69/16* (2013.01); *H04L 69/165* (2013.01)

(58) Field of Classification Search
CPC ..................................................... H04L 69/16
See application file for complete search history.

(56) References Cited

U.S. PATENT DOCUMENTS

| | | | | |
|---|---|---|---|---|
| 9,552,254 | B1* | 1/2017 | Franklin | G06F 11/1004 |
| 2003/0220996 | A1* | 11/2003 | Yang | H04L 63/101 |
| | | | | 709/223 |
| 2005/0129020 | A1* | 6/2005 | Doyle | H04L 69/14 |
| | | | | 370/392 |
| 2007/0174363 | A1* | 7/2007 | Courtney | G06F 11/1076 |
| 2008/0291912 | A1* | 11/2008 | Choi | H04L 69/22 |
| | | | | 370/389 |
| 2010/0094957 | A1* | 4/2010 | Zuckerman | H04L 67/1002 |
| | | | | 709/219 |
| 2010/0095012 | A1* | 4/2010 | Zuckerman | H04L 67/1002 |
| | | | | 709/231 |
| 2010/0122305 | A1* | 5/2010 | Moloney | G06F 21/10 |
| | | | | 725/93 |
| 2010/0257146 | A1* | 10/2010 | Memon | G06F 3/061 |
| | | | | 707/693 |
| 2015/0205979 | A1* | 7/2015 | Dong | G06F 21/568 |
| | | | | 726/22 |

* cited by examiner

*Primary Examiner* — Lashonda Jacobs
(74) *Attorney, Agent, or Firm* — Muncy, Geissler, Olds & Lowe, P.C.

(57) ABSTRACT

A file transfer method adaptive to a server is disclosed. The file transfer method includes following steps: dividing the file into a plurality of fragments; sending a piece of validation data of the file to at least one client based on TCP; multicasting the plurality of fragments to the at least one client based on UDP; determining whether a command from the at least one client questing for reissuing to send a lost part of the plurality of fragments is received; sending the lost part of the plurality of fragments to the corresponding client based on TCP when the command is received.

9 Claims, 3 Drawing Sheets

FILE TRANSFER METHOD

CROSS-REFERENCE TO RELATED APPLICATIONS

This non-provisional application claims priority under 35 U.S.C. §119(a) on Patent Application No. 104105623 filed in Taiwan, R.O.C on Feb. 17, 2015, the entire contents of which are hereby incorporated by reference.

BACKGROUND

Technical Field

The present disclosure relates to a file transfer method, particularly relates to a file transfer method combining Transmission Control Protocol (TCP) and User Datagram Protocol (UDP).

Description of the Related Art

Transmission Control Protocol (TCP) is a connection oriented and reliable transmission and applies data validation during transmission to ensure data correctness, so that the transmission based on TCP requires more time.

On the contrary, User Datagram Protocol (UDP) is a connectionless and non-reliable transmission and does not apply data validation to ensure data correctness. In addition, UDP does not re-send the lost data, receive the data in order, and provide a reply mechanism to control the speed of data flow. Therefore, the data transmission speed based on UDP may be faster than the processing speed of the receiving terminal and UDP packets may be lost or repeated during network transmissions.

SUMMARY

A file transfer method applicable for a server includes dividing a file into a plurality of fragments, sending a piece of validation data of the file to at least one client based on Transmission Control Protocol (TCP), multicasting the plurality of fragments to the at least one client based on User Datagram Protocol (UDP), determining whether a command from the at least one client questing for reissuing to send a lost part of the plurality of fragments is received, and sending the lost part of the plurality of fragments to the corresponding client based on TCP when the command is received.

A file transfer method applicable for a client includes receiving a piece of validation data of a file from a server based on TCP, receiving a non-lost part of a plurality of fragments multicasted by the server based on UDP, generating a command for reissuing to send a lost part of the plurality of fragments based on the validation data and the received non-lost part of the plurality of fragments, sending the command to the server, and receiving the lost part of the plurality of fragments sent by the server based on TCP.

A file transfer method includes dividing a file into a plurality of fragments in a server, the server sending a piece of validation data of the file to at least one client based on TCP, the server multicasting the plurality of fragments to the at least one client based on UDP for the at least one client to receive a non-lost part of the plurality of fragments, generating a command for reissuing to send the lost part of the plurality of fragments based on the validation data and the received non-lost part of the plurality of fragments, the at least one client sending the command to the server, the server determining whether the command from the at least one client questing for reissuing to send the lost part of the plurality of fragments is received, and the server sending the lost part of the plurality of fragments to the corresponding client based on TCP when the server receives the command.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
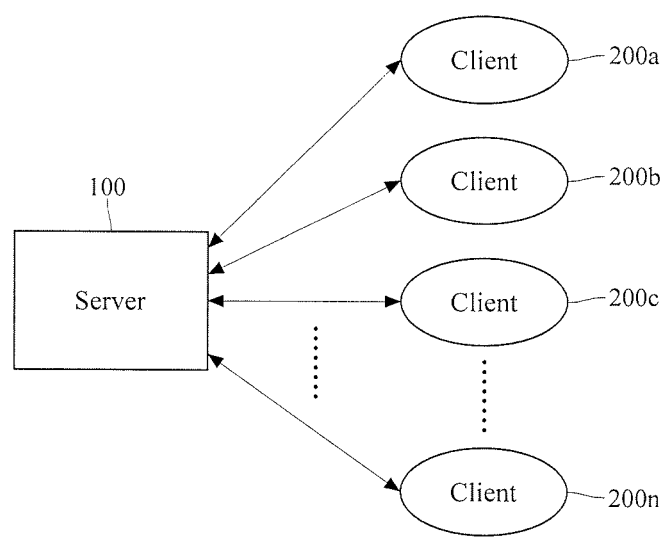
FIG. 1 and FIG. 2 are diagrams of the file transfer method according to an embodiment.
Figure 2:
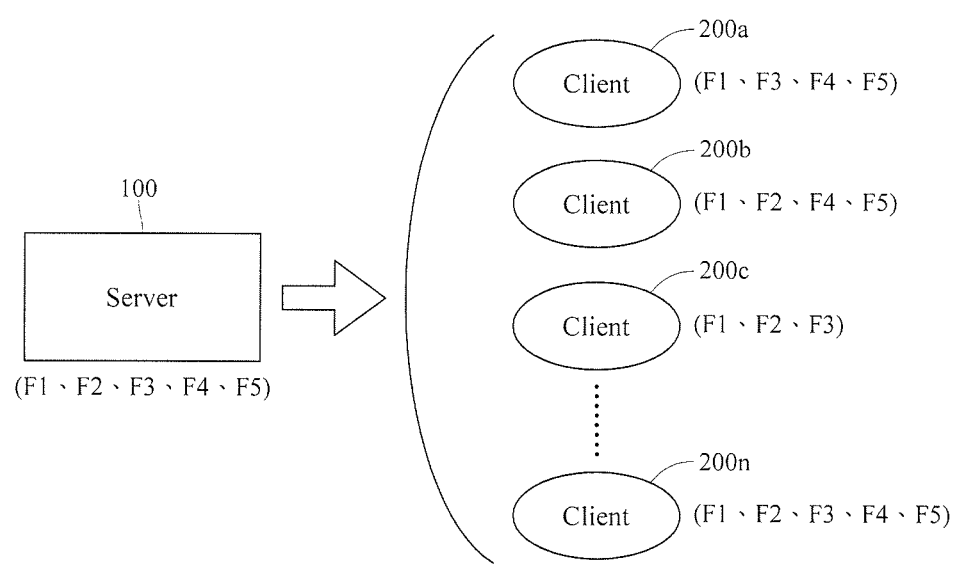

Please refer to FIG. 1 and FIG. 2. FIG. 1 and FIG. 2 are diagrams of the file transfer method according to an embodiment. In FIG. 1, the communication between the server 100 and the client 200 is based on Transmission Control Protocol (TCP). In FIG. 2, the communication between the server 100 and the client 200 is based on User Datagram Protocol (UDP). In addition, the client 200 further includes the clients 200*a*~200*n*.

In the embodiment of the present disclosure, the server 100 and the client 200 are various electronic devices with network transmission functions, such as tablet computers or smart phones. In the following explanations, an example is used to describe the interactions between the tablet computers of a teacher and multiple students. The server 100 refers to the tablet computer of the teacher, and the clients 200*a*~200*n* refer to the tablet computers of multiple students.

When the teacher wants to send lecture slide contents saved in the server 100 to a plurality of students, after the teacher activates the file transmission, the server 100 firstly divides the file of the lecture slide contents into a plurality of fragments, and each of the plurality of fragments has a corresponding serial number, such as F1, F2, F3, F4, F5 in FIG. 2. The number of the plurality of fragments of the divided file is determined based on different situations and is not limited to the present embodiment. In the present embodiment, the size of the fragment does not exceed 1500 byte. Next, as shown in FIG. 1, the validation data is sent to the clients 200*a*~200*n* based on TCP before the server 100 sends the plurality of fragments to the students.

In addition, in the embodiment of the present disclosure, the server 100 adds a corresponding serial number to each of the plurality of fragments of the file, and records the serial numbers of the plurality of fragments of the file to the validation data, and sends the validation data to the clients 200*a*~200*n* based on TCP. Because the correctness of the data transmission is ensured in TCP, after the validation data is sent by the server 100 based on TCP, the clients 200*a*~200*n* are able to obtain the serial numbers of the plurality of fragments corresponding to the file of the lecture slide contents from the validation data before receiving the file sent from the server 100. The obtained serial numbers are for confirming whether some fragments are lost during the transmission. The details are specifically explained hereinafter.

As shown in FIG. 2, the server 100 multicasts all of the plurality of fragments F1, F2, F3, F4, F5 to the clients 200a~200n based on UDP. In addition, after multicasting all of the plurality of fragments, the server 100 further sends a termination message to the client 200, and each of the clients determines whether the termination message is received to confirm whether the multicasting process by the server 100 is finished. The advantage of UDP is the fast transmission. However, UDP is not a reliable and packets may be lost during the multicasting transmission because of electromagnetic interference or bad connection. Therefore, the clients 200a~200n possibly receive the non-lost part of the plurality of fragments multicasted by the server based on UDP. In other words, part of the students possibly do not receive the whole lecture contents. Therefore, the clients which do not receive the whole lecture contents activate the mechanism for reissuing file transmission.

In the embodiment of the present disclosure, each of the clients 200a~200n is able to capture the corresponding serial numbers of the received non-lost part of the plurality of fragments from the packet headers. For example, the serial numbers of the non-lost part of the plurality of fragments received by the client 200a are F1, F3, F4, F5, and the serial numbers of the non-lost part of the plurality of fragments received by the client 200b are F1, F2, F4, F5, and the serial numbers of the non-lost part of the plurality of fragments received by the client 200c are F1, F2, F3, and the client 200n does not have any lost fragment.

When the clients 200a~200n respectively receive the non-lost part of the plurality of fragments multicasted by the server 100 based on UDP and ensure that the multicasting process of the server 100 is finished, each of the clients further generates a command based on the validation data and the received non-lost part of the plurality of fragments, wherein each of the clients 200a~200n ensures that the multicasting process of the server 100 is finished when a termination message is received. The command is for reissuing to send the lost part of the plurality of fragments later. In addition, each of the clients 200a~200n generates the command based on the serial numbers of the plurality of fragments in the validation data and the serial numbers of the received non-lost part of the plurality of fragments. Therefore, the command has at least one serial number of the lost part of the plurality of fragments. For example, when the clients know that the plurality of fragments are F1~F5 and receive the non-lost part of the plurality of fragments, the client 200a generates a command for reissuing to send the lost part of the plurality of fragments F2, and the client 200b generates a command for reissuing to send the lost part of the plurality of fragments F3, and the client 200c generates a command for reissuing to send the lost part of the plurality of fragments F4, F5. Next, the clients 200a~200c send the corresponding command to the server 100.

Correspondingly, the server 100 determines whether the commands for reissuing to send the lost part of the plurality of fragments F1~F5 from the clients 200a~200n are received. Next, as shown in FIG. 1, the server 100 sends the lost part of the plurality of fragments F1~F5 to the corresponding client based on TCP when receiving the corresponding command. In addition, in the embodiment of the present disclosure, the server 100 sends the lost part of the plurality of fragments to the corresponding client based on the at least one serial number of the lost part of the plurality of fragments. For example, based on TCP, the server 100 sends the fragment F2 to the client 200a, and sends the fragment F3 to the client 200b, and sends the fragments F4, F5 to the client 200c. Correspondingly, the clients 200a~200c respectively receive the lost part of the plurality of fragments from the server 100 based on TCP.

Generally, transferring a file based on TCP takes more time than transferring the same file based UDP because TCP is a reliable transmission. However, in the present disclosure, the proportion of the lost part of the plurality of fragments is relatively small related to the proportion of the non-lost part of the plurality of fragments. Therefore, the server 100 sends most of the plurality of fragments, that is, the non-lost part of the plurality of fragments, or all of the plurality of fragments based on UDP, and receives the command for reissuing to send the lost part of the plurality of fragments from the clients 200a~200c to send the lost part of the plurality of fragments based on TCP. The reliability of TCP and the advantage of fast transmission of UDP are combined accordingly.

Figure 3:
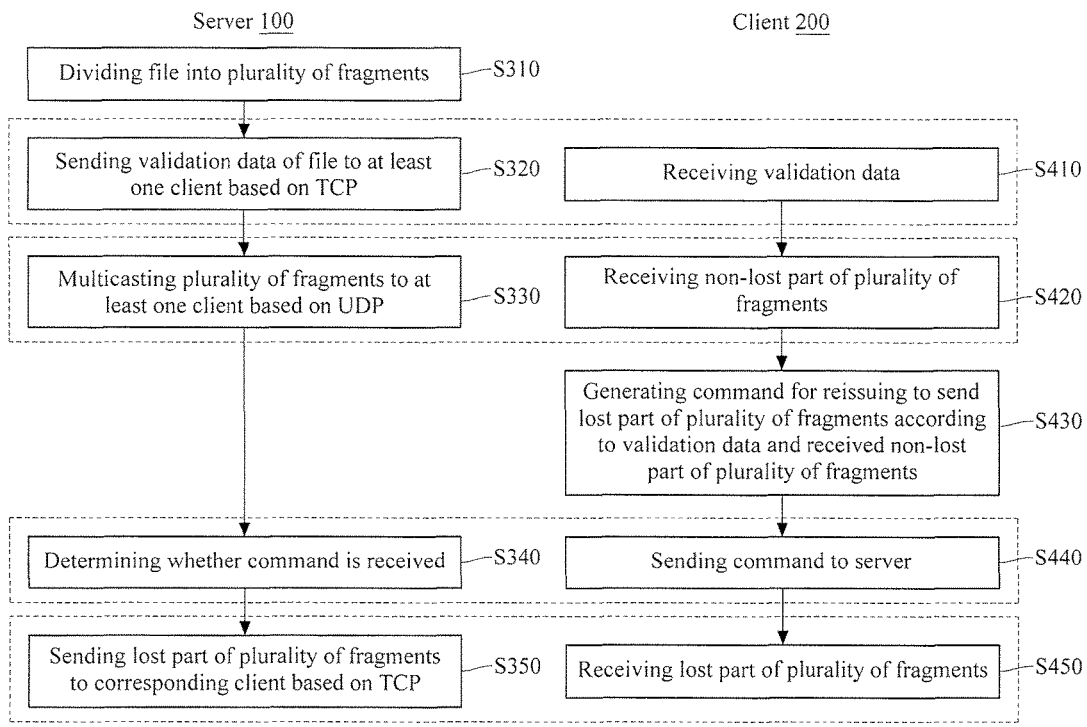
FIG. 3 is a flowchart of the file transfer method according to an embodiment.

Please refer to FIG. 3. FIG. 3 is a flowchart of the file transfer method according to an embodiment. As shown in FIG. 3, the file transfer method of the present disclosure includes the steps S310~S350 for the server and the steps S410~S450 for the client. In FIG. 3, the circled two steps refer to a corresponding relationship between the two steps, such as the step S320 and the step S410, the step S330 and the step S420, the step S340 and the step S440, and the step S350 and the step S450.

In the step S310, the server divides a file into a plurality of fragments. In the step S320, the server sends a piece of validation data of the file to at least one client based on TCP. In the step S330, the server multicasts the plurality of fragments to the at least one client based on UDP. In the step S340, the server determines whether a command from the at least one client questing for reissuing to send a lost part of the plurality of fragments is received. In the step S350, the server sends the lost part of the plurality of fragments to the corresponding client based on the TCP when the command is received.

In the step S410, the client receives a piece of validation data of a file from a server based on TCP. In the step S420, the client receives a non-lost part of a plurality of fragments multicasted by the server based on UDP. In the step S430, the client generates a command for reissuing to send a lost part of the plurality of fragments based on the validation data and the received non-lost part of the plurality of fragments. In the step S440, the client sends the command to the server. In the step S450, the client receives the lost part of the plurality of fragments sent by the server based on TCP. The aforementioned steps are explained above and are not further described hereinafter.

The server of the present disclosure divides a file into a plurality of fragments and adds a corresponding serial number to each of the plurality of fragments, and multicasts the plurality of fragments to clients based on UDP to transfer most of the file data. The client receives the validation data based on TCP and generates the command for reissuing to send a lost part of the plurality of fragments to the server based on the validation data and the received non-lost part of the plurality of fragments after receiving the termination message. The server sends the lost part of the plurality of fragments to the client based on the command based on TCP. Therefore, the reliability of TCP and the advantage of fast transmission of UDP are combined.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A file transfer method applicable for a server, the method comprising:
   dividing a file into a plurality of fragments;
   sending a piece of validation data of the file to at least one client based on Transmission Control Protocol (TCP);
   multicasting the plurality of fragments to the at least one client based on User Datagram Protocol (UDP);
   determining whether a command from the at least one client questing for reissuing to send a lost part of the plurality of fragments is received; and
   sending the lost part of the plurality of fragments to the corresponding client based on TCP when the command is received.

2. The file transfer method of claim 1, wherein the step of sending the validation data of the file to at least one client based on TCP comprises:
   adding a corresponding serial number to a header of a packet corresponding to each of the plurality of fragments; and
   recoding the plurality of serial numbers of the plurality of fragments to the validation data.

3. The file transfer method of claim 2, wherein the command has at least one serial number of the lost part of the plurality of fragments, and the step of sending the lost part of the plurality of fragments to the corresponding client based on TCP when the command is received comprises:
   sending the lost part of the plurality of fragments to the client based on the at least one serial number of the lost part of the plurality of fragments.

4. The file transfer method of claim 3, after the step of multicasting the plurality of fragments to the at least one client based on UDP, further comprising:
   sending a termination message to the at least one client.

5. A file transfer method applicable for a client, the method comprising:
   receiving a piece of validation data of a file from a server based on TCP;
   receiving a non-lost part of a plurality of fragments multicasted by the server based on UDP;
   generating a command for reissuing to send a lost part of the plurality of fragments based on the validation data and the received non-lost part of the plurality of fragments;
   sending the command to the server; and
   receiving the lost part of the plurality of fragments sent by the server based on TCP.

6. The file transfer method of claim 5, wherein a serial number corresponds to each of the plurality of fragments, and the validation data records the plurality of serial numbers, and the step of receiving the non-lost part of the plurality of fragments multicasted by the server based on UDP further comprises:
   capturing the corresponding serial number from a header of a packet corresponding to each of the non-lost part of the plurality of fragments.

7. The file transfer method of claim 6, wherein the step of generating the command for reissuing to send the lost part of the plurality of fragments based on the validation data and the received non-lost part of the plurality of fragments comprises:
   generating the command based on the plurality of serial numbers of the plurality of fragments in the validation data and the serial numbers of the non-lost part of the plurality of fragments;
   wherein the command has at least one serial number of the lost part of the plurality of fragments.

8. The file transfer method of claim 7, before the step of generating the command based on the validation data and the received non-lost part of the plurality of fragments, further comprising:
   determining whether a termination message sent by the server is received; and
   generating the command based on the validation data and the received non-lost part of the plurality of fragments when the termination message is received.

9. A file transfer method, comprising:
   dividing a file into a plurality of fragments in a server;
   the server sending a piece of validation data of the file to at least one client based on TCP;
   the server multicasting the plurality of fragments to the at least one client based on UDP for the at least one client to receive a non-lost part of the plurality of fragments;
   generating a command for reissuing to send the lost part of the plurality of fragments based on the validation data and the received non-lost part of the plurality of fragments;
   the at least one client sending the command to the server;
   the server determining whether the command from the at least one client questing for reissuing to send the lost part of the plurality of fragments is received; and
   the server sending the lost part of the plurality of fragments to the corresponding client based on TCP when the server receives the command.

* * * * *